United States Patent [19]

Hultholm et al.

[11] Patent Number: 4,648,973

[45] Date of Patent: Mar. 10, 1987

[54] WAY TO OXIDIZE SLUDGE WITH HIGH SOLID MATTER CONTENT

[75] Inventors: Stig-Erik Hultholm; Launo L. Lilja; Valto J. Mäkitalo, all of Pori; Bror G. Nyman, Vanha-Ulvila, all of Finland

[73] Assignee: Outokumpu Oy, Helsinki, Finland

[21] Appl. No.: 582,331

[22] Filed: Feb. 22, 1984

[30] Foreign Application Priority Data

Feb. 24, 1983 [FI] Finland ................................ 830614

[51] Int. Cl.[4] ............................................ C02F 11/02

[52] U.S. Cl. .................................... 210/629; 210/758

[58] Field of Search ............... 210/629, 197, 613, 609, 210/758, 765, 209, 220

[56] References Cited

U.S. PATENT DOCUMENTS 4,100,071 7/1978 Beurer et al. ....................... 210/197

4,251,371 2/1981 Bauer et al. ......................... 210/197

4,278,546 7/1981 Roesler ........................... 210/629 X

*Primary Examiner*—Tom Wyse

*Attorney, Agent, or Firm*—Brooks Haidt Haffner & Delahunty

[57] ABSTRACT

The present invention concerns a way in which to conduct oxygen or a gas containing oxygen into a counter-bubble reactor according to the invention, preferably into the upper part of the reactor, and at all events distinctly above the bottom of the reactor; to disperse the gas in a sludge with high solid content, and to impart to the sludge a flow first in the counterbubble zone of the reactor downward, reversing in the vicinity of the bottom, and in the ascending zone of the reactor upwards, and thereby to achieve rapid dissolving of the gas in the sludge and efficient reacting of oxygen and sludge at low energy cost.

3 Claims, 10 Drawing Figures

WAY TO OXIDIZE SLUDGE WITH HIGH SOLID MATTER CONTENT

Figure 1:
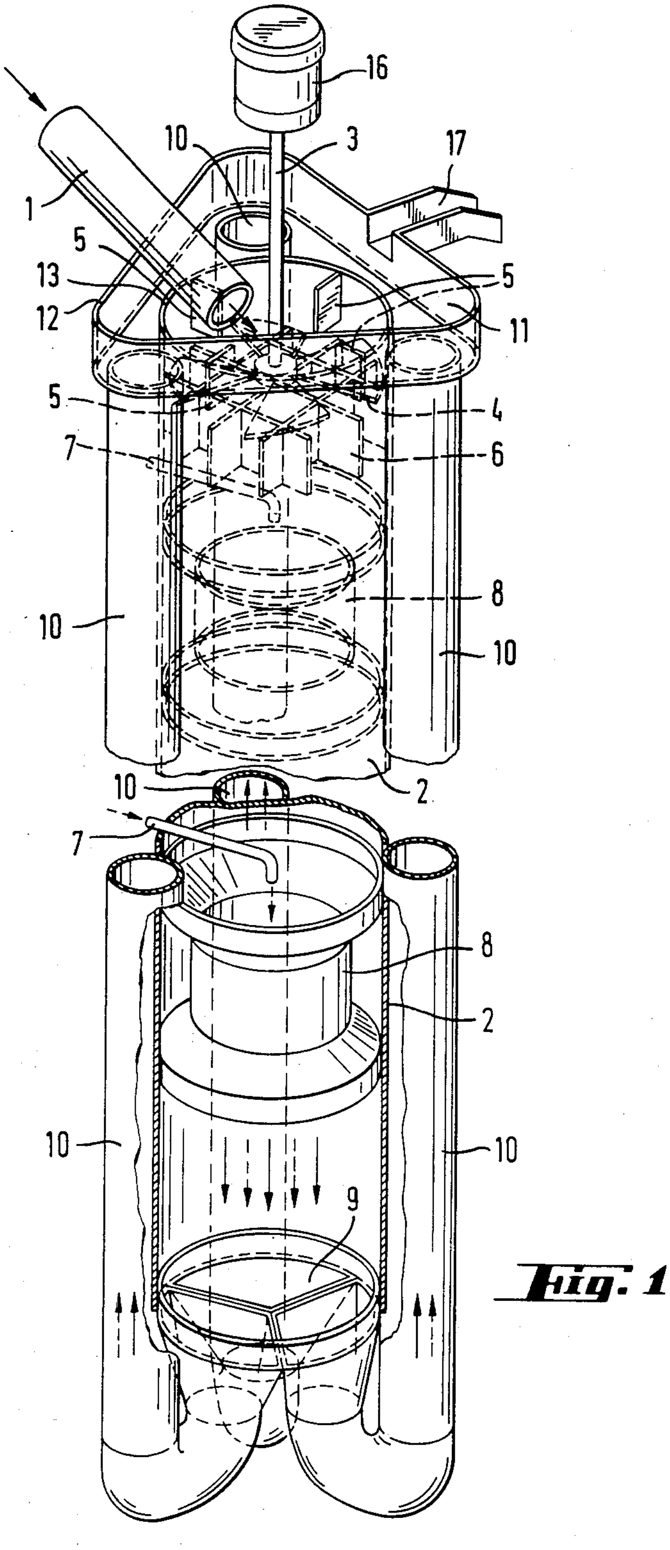

The present invention concerns a way in which to introduce desired oxygen, or a gas containing oxygen, into an open pressure reactor, a counterbubble reactor, preferably into the top part of the reactor and at all events clearly above the bottom of the reactor, to disperse the gas in a sludge with high solid matter content of a pulverous solid and a liquid, and to produce in the sludge a flow directed at first downwards in the counterbubble zone of the reactor, turning in the vicinity of the bottom, and being upward directed in the ascending zone of the reactor, the velocity of said flow being under control and in this way being achieved fast dissolving in the sludge of the oxygen carried in the gas as well as efficient reacting of oxygen and sludge, at low energy cost.

For conducting and dispersing oxidizing gas into a sludge of pulverous solid and liquid, a number of quite useful procedures are known in the art, for instance the procedure disclosed in the Finnish patent application No. 822936, where the oxidizing gas is introduced under a mixer of special design. The mixer operates successfully within its range of operation, in particular in the range in which the reactors have a height/diameter ratio about 1 ($H/T \approx 1$). In the case of large sludge quantities, in particular with ores poor in metal contents, or when to the purpose of accelerating the dissolving and reacting of the oxygen it is advantageous to use elevated pressure, a tall reactor is a sensible alternative, and then the mixer type just discussed will be too big and is not compatible with a tall reactor.

For dispersing gas in a sludge, the procedure disclosed in the Finnish patent application No. 822937 has also been used with success, wherein dispersing takes place by the aid of a vigorously moving mixer member attending to a given mixing area. This procedure is also applicable for the mixing done in tall reactors, but after the mixing area has come to an end (the limiting height), the ascending gas bubble array takes care of mixing the sludge, and therefore the quantity of oxidizing gas has to be adequate to produce this flow. Particularly when oxygen is used, the gas quantity is not sufficient.

A design which is adjacent to the present invention has been presented in the U.S. Pat. No. 3,532,327, where the object is to produce a suspension entered by a liquid and a solid and to maintain it. When to this design solution is added a third phase, as in the present invention, the requirements grow rather more difficult.

In the Finnish Pat. No. 35 233, a procedure and a means have been disclosed for aerating waste waters by the aid of a particular air supply pipe through which air is conducted to the bottom of the waste water basin. Waste waters have a minimal solid matter content, which is therefore immaterial as regards the operating requirements, in contrast to conditions in the way according to the present invention.

The dispersing of gas in a liquid has also been described in the reference: Chem.-Ing.-Tech. 50 (1978), No. 12, p. 944–947. In this instance, too, the third phase adding to the complexity of the problem—the solid matter—is lacking.

An interesting alternative for circulating sludge is the so-called "loop reactor", one such being presented, for instance, in the reference: Journal of Chemical Engineering of Japan, Vol. 12 No. 6, 1979, p. 448–453. In said apparatus no use is made of the hydrostatic pressure gained from height, nor is any gas dispersing associated with the reactions. The reactor is of an enclosed design.

As is evident from the state of art presented in the foregoing, in none of them has been presented any procedure or apparatus by which all criteria, in particular those set for the processes of low grade ores, could be simultaneously met. By the aid of the way taught in the invention, it is the object to achieve a good suspension between three different phases, that is, a pulverous solid, a liquid and a gas, in a great reactor where the height is a multiple of the diameter and in the lower section of the reactor prevails elevated pressure. The solid matter content of the sludge fed into the reactor is high, 30–70% by weight, and the solid matter is rather coarse pulverous solid matter. The oxygen-carrying gas that is fed into the reactor is according to the invention made to disperse with maximum efficiency among the sludge and thereby to produce a suspension between the three different phases, and thence further to dissolve in the sludge and to react with the sludge. The reactor, and consequently the reaction space, is divided into a plurality of zones, in the first of them taking place the dispersion, dissolution and in part also the chemical reactions. In the second zone, the chemical reactions continue under elevated pressure, and in the third zone the gas which has not reacted reseparates to form bubbles in the sludge and it may, if needed, be separated from the sludge or returned into circulation, if desired. The main characteristics of the invention are readable in claim 1.

In the way taught by the invention, the flow of the sludge between the pulverous solid matter and the liquid, downward from the middle section of the reactor, is achieved by means of a propeller mixer producing the best possible axial flow, by pump circulation or in another appropriate way. The oxygen or the gas containing oxygen may be conducted onto the surface of the solution, for instance into the suction eye caused by the propeller, or most advantageously introduced below the mixer by the aid of a venturi known to act as a good mixer. The introduction of gas may also be at several different heights, though essentially at locations before the bottom space of the reactor.

The operating range of the pumping means should be such as to enable the downward velocity of the sludge to be adjusted to be for instance in the range of 0.5–2.0 m/sec. The flow velocity to be selected depends among other things on the sludge circulation path length, i.e., the depth of the pressure reactor, and on the oxygen demand of the sludge. In the first zone of the reaction space, the counterbubble zone, the gas bubbles conducted into the sludge at the initial end of its circulation and being dispersed therein tend to rise upward due to buyoancy although the direction of the sludge flow is downward, and hereby a differential velocity is created between the gas bubble and the sludge, causing dissolving of oxygen in the gas bubble and in the sludge, as well as turbulent flows promoting the reactions and spreading out the bubbles. With further downward progress of the flow, the bubble size decreases, owing to increase of pressure as well as to the dissolving and reacting of oxygen. Hereby, at a certain distance from the surface all oxygen has dissolved in the solution, and also partly reacted. Depending on the rate of the oxygen-consuming oxidation reactions, the oxygen bubbles as a rule disappear entirely 10–25 meter after the last oxygen feeding point, this being in its turn due to the surprisingly fast dissolution of the oxygen and to the oxygen-consuming oxidation reactions. The rate of the oxidation reactions is usually so high that the rate of oxidation is not determined by them but rather by the dissolving rate of oxygen.

As the sludge flows downward with a velocity higher than that of the oxygen bubbles, sludge with lower oxygen content coming from above hits the bubbles and is transformed below them into sludge with higher oxygen content, and this increases decisively the dissolving rate of the oxygen bubbles as the concentration gradient becomes greater. Another phenomenon which accelerates the dissolving of oxygen is a consequence of the same, so-called counterbubble principle: The flow caused by buoyancy and which is slower with reference to the sludge sets the oxygen bubbles in fast oscillation, and this reduces the diffusion distances of oxygen in the sludge and also makes the oxygen concentration gradient higher, and consequently it accelerates the dissolving of oxygen in the sludge.

The actual oxidation reactions, again, are fastest in the wake of the bubbles, where oxygen has quite recently been solved in the sludge. The relative differential velocity between bubbles and sludge also results in closer bubble clustering, in particular immediately below the oxygen supply point, where the differential velocity is highest owing to maximum bubble size. It is thus understood that said turbulent flow operating according to the counterbubble principle substantially promotes the oxidation. It is therefore to advantage to maintain the volume of the downward flow comparatively large, related to the entire cross-section area of the reactor.

In accordance with what has been said above, the oxygen that is conducted into the reactor is all supplied into the reactor in the first zone, that is, in the counterbubble zone. Consistent with the flow direction of the oxygen bubbles and of the sludge, the hydrostatic pressure also increases in the reactor and aids the oxygen dissolution and the oxidation reactions. In the second zone of the reactor, located in its lower part, that is in the so-called solved oxygen zone, all oxygen is virtually solved and the oxidation reactions continue under elevated pressure. In the lower part of the reactor, the direction of the sludge flow is reversed substantially 180°, however so that the flow cross section area is not reduced at the turning point of the flow, but that it does not increase to be more than triple either. At the turning point, the velocity of the sludge flow should be such that no regions of backflow occur, nor any sedimentation of solid matter.

When the direction of flow of the sludge has turned substantially upward, the pressure falls in the flow direction of the solution, and hereby the oxygen remaining in the sludge that has not reacted, and other gases if any (argon, nitrogen), produce gas bubbles once again. This ascending zone of the reactor is also called the regasified oxygen zone. The gas bubbles formed at this zone grow as they ascend, introducing extra energy into the circulation in the form of buoyancy. The sludge and the gas bubbles now move both in the same direction, and the differential velocity is therefore not as great as in the counterbubble zone. In the ascending zone, the sludge flow should be such that the flow velocity is a multiple of the velocity at which even the coarsest solid matter particles descend. In the ascending zone also no backflows propitious for settling of solid matter must be produced. In the upper part of the ascending zone, the direction of the flow is reversed close to the free surface back towards the central part of the reactor to flow downward again, for dissolving oxygen and thereby furthering the oxidation reactions in the sludge. The ascending zone may be located annularly around the counterbubble zone, it may also consist of one or several separate, substantially parallel zones beside the counterbubble zone or encircling it.

The design of the upper part of the ascending zone is of major significance in the present invention. If the cross-section area of the upper part of the reactor is the same as the cross-section area at other points of the reactor, the sludge level may vary considerably in accordance with the gas content of the reactor, that is, the quantity of gaseous oxygen in the reactor. When the level of the sludge in the reactor has fallen, the propeller producing the downward flow may end up rotating in air, in a so-called "gas bubble"; this implies complete collapse of its efficiency and, which is even worse, quite often the infliction of damage to it. In order to stabilize the sludge level, it is to advantage to provide, as taught by the invention, a widening structure in the upper part of the reactor's ascending zone. The widening may also be utilized to separate the potential gas bubbles (e.g. argon+nitrogen) from the sludge circulation. The widening in the upper part of the ascending zone also encircles the upper part of the counterbubble zone.

The counterbubble reactor of the invention is also called a CB reactor, referring to the physical phenomenon taking place in the first zone: the tendency of the bubble to move in countercurrent with reference to the sludge.

When a propeller is used for circulating the sludge, it is known that the propeller, while rotating in the sludge, gives rise to the so-called vortex phenomenon, in other words, the gas over the sludge surface penetrates by effect of this suction phenomenon in the centre of the reactor in trumpet form down to the propeller, with the result that the propeller rotates in a so-called "gas bubble". This causes, as was stated before, the efficiency to be lowered, as well as damage due to bending of the propeller shaft. To avoid said phenomenon, it is known in the art to use appropriate flow baffles before the propeller. Under the propeller, a flow straightener of grid-type can be used, its purpose being to prevent circulation of the sludge from the reactor space after the propeller, because such circulation has a detrimental effect on the gas bubble distribution.

Although flow obstacles inhibit the forming of a vortex, a strong suction area is preserved at a certain point above the propeller, the oxygen or oxygen-containing gas conducted into this area being efficiently drawn through the propeller into the sludge. Hereby, the propeller also acts as a gas-dispersing member. It is to be noted, however, that in this case, too, the propeller easily loses its efficiency if too much gas is conducted therethrough and a large "gas bubble" can be formed, and as a consequence of this the sludge circulation and the gas dispersion both cease.

The shape and the size of the propeller are selected in a way which will give a good sludge pumping performance for the propeller: good gas dispersion mixers specifically fail to do this. It is therefore not worth while to use too much propeller power towards gas dispersing; it is to greater advantage to introduce the oxygen below the propeller and to use the propeller primarily for pumping the sludge flow. The diameter of the propeller is advantageously about 90% of the diameter of the counterbubble tube.

In order to be able to efficiently disperse gas into sludge with a high solid content it is to be preferred to use apparatus suited for this purpose. In that connection, the risks of blocking and abrasion have to be taken into account in the first place. One of the simplest ways to do this, and by reason of the good efficiency of the CB reactor at the same time one of the appropriate ways, is the use of a mere straight tube. After the point of insertion of oxygen or oxygen-containing gas, a venturi-resembling throttling portion is advantageous, owing to its good mixing feature and to its low pressure drop. It is essential that in the CB reactor the oxygen gas can be dispersed into the sludge flowing in the region of the throttling point using considerably less energy than is implied by other ways of dispersion taking place in a reactor of less favourable shape and which are primarily based on vigorous mixing.

The feeding of oxygen or of oxygen-containing gas in the counterbubble zone at different heights is advantageous, and frequently even indispensable. Owing to the dissolving and reaction of oxygen, a situation may arise in which the oxygen runs out almost completely in the sludge. This results in detrimental reduction, and these harmful reactions can be avoided by supplying oxygen in an adequate quantity at a sufficient number of different feeding points. The quality of the gas may be different at the different feeding points if the process so requires.

In the event of failure to mix the oxygen immediately and efficiently with the sludge, local overdosage of oxygen may ensue, resulting in passivation, i.e., stopping of the chemical reactions. By the aid of the apparatus of the present invention, the oxygen can be introduced at a plurality of locations and its quantity can be controlled, and since the counterbubble reactor acts as a good mixer, local passivation phenomena can be prevented. Moreover, this can be avoided by means of temperature control.

When the solid matter supplied in sludge form into the reactor, the ore, is low grade but ample in quantity, the sludge quantity produced is also great. Since the solid matter is rather coarse, the flow velocity of the sludge must be so controlled that the solid matter is held in the sludge at every point of the reactor and will not sink to the bottom. Because of the large sludge quantities and high flow velocities, endeavours must be aimed at minimizing the pressure drops. This has been especially heeded in the apparatus embodiments of the present invention, where the ratio of the cross-section areas of the reactor tubes in the counterbubble zone and in the ascending zone is within the range of 0.2–3.

The hydrostatic pressure increases uniformly towards the bottom of the reactor, this increase depending on the density of the reactor contents. When dilute aqueous solutions or sludges are oxidized, the pressure increases about 1 bar over each ten meters, while if the solid matter content of the sludge is about 50% by weight, the increase of pressure is about 1.5 bar/10 m. The solubility of oxygen in water under 1 bar absolute pressure in the temperature range of 0°–100° C. is 48.9–17.0 l $O_2/m^3$ (NTP). Since the solubility of oxygen in the aqueous solution increases in direct proportion to the pressure, it is possible by the counterbubble circulation of the invention to attain with comparative ease the elevated oxygen concentrations which are prerequisite to rapid oxidation reactions. The procedure and means of the invention are particularly well fit to be used when processing thick hydrometallurgical sludges, such as when dissolving uranium from uranium ores or precious metals from complex ores containing sulphides. Counterbubble circulation is particularly well suited for processing exceedingly low grade ores, in which case the method of treatment includes as an essential component part the need of oxidation, such as the oxidizing of ferrous iron to ferric iron in uranium dissolving, or oxidizing sulphides to element sulphur and/or sulphate in dissolving sulphide ores. When low grade ores are treated, the sludge density is high as a rule, whereby in the lower part of the reactor high pressures are attained, e.g. over 5 bar at 30 m depth in the reactor; and high pressure aids the oxidation.

Figure 2:
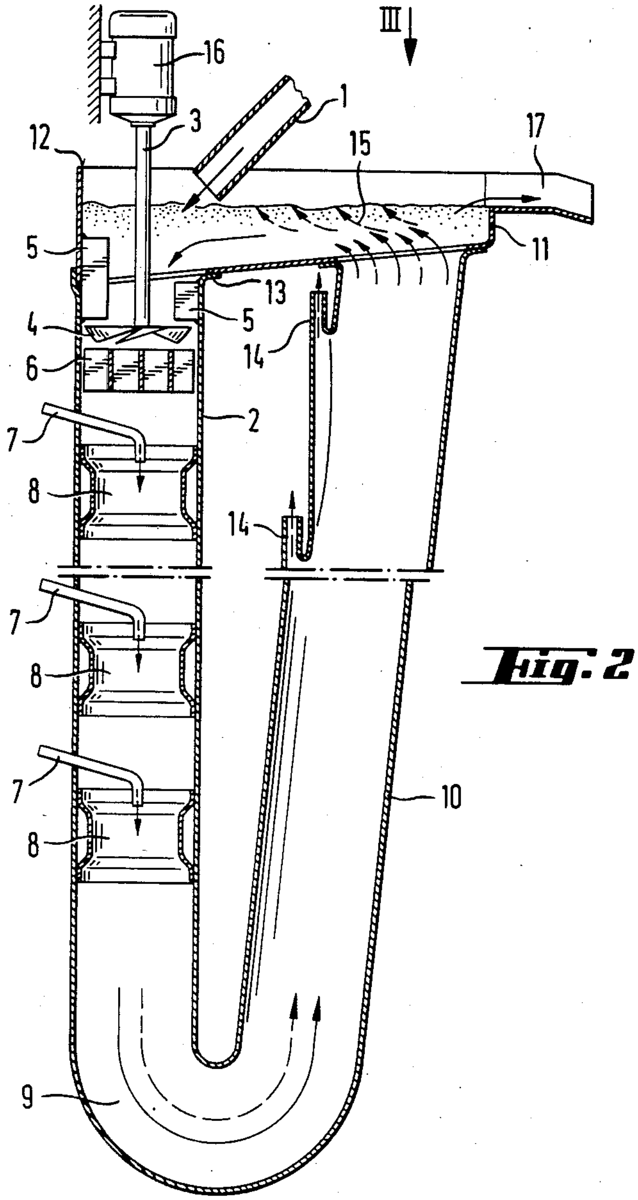
Figure 3:
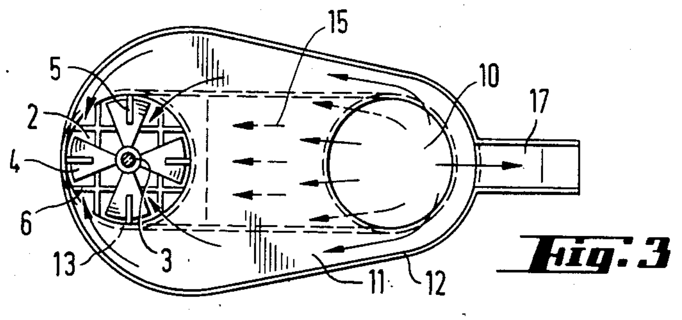
Figure 4:
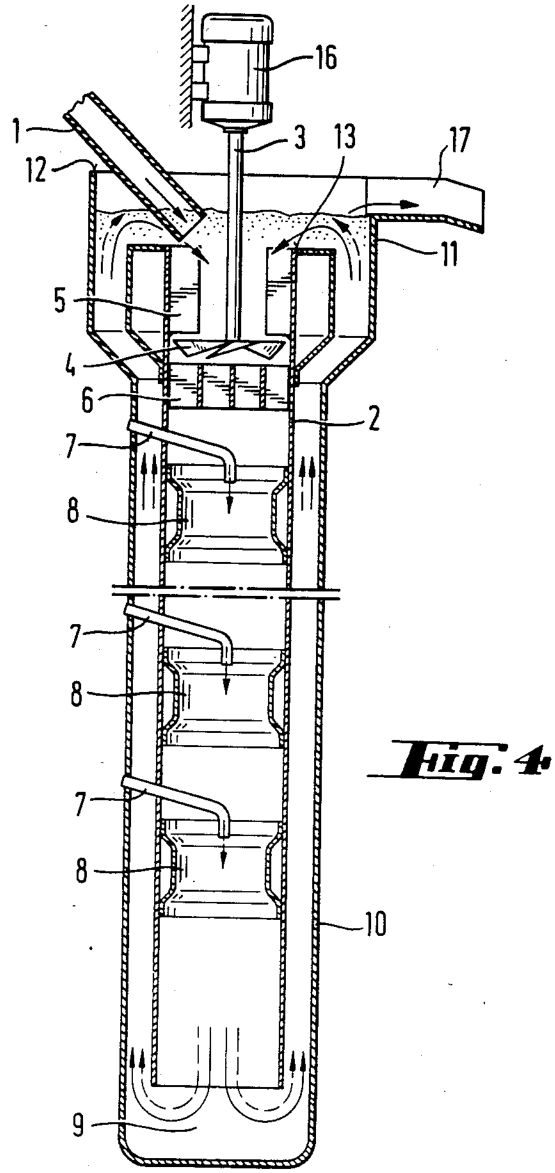
Figure 5:
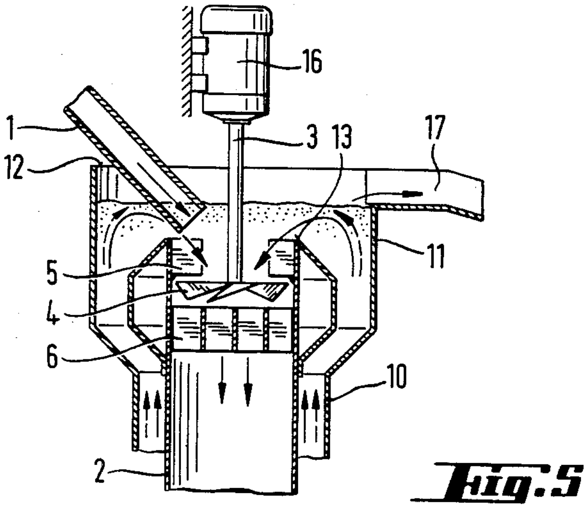
Figure 6:
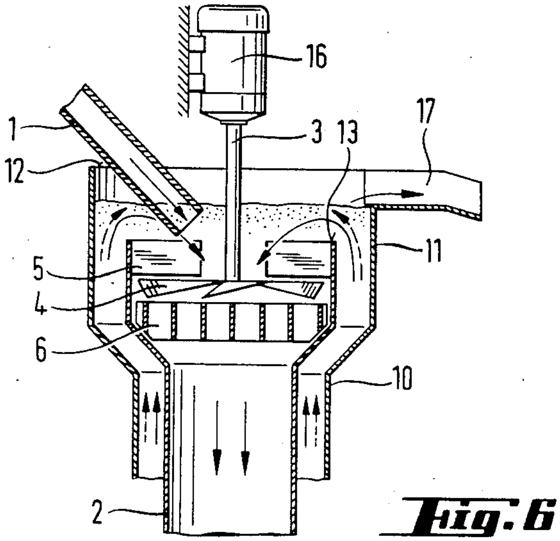
Figure 7:
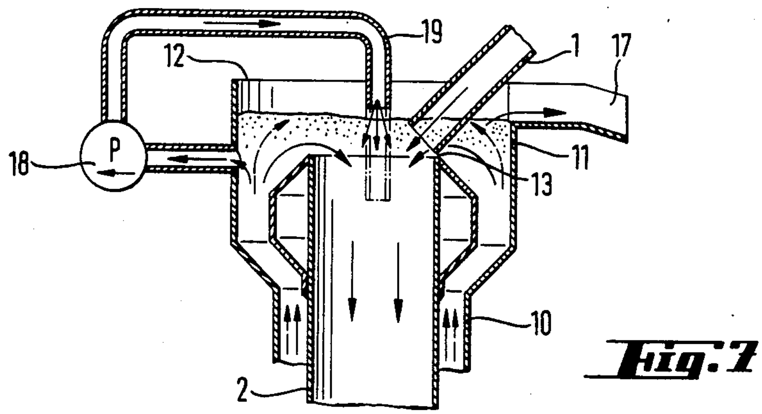
Figure 8:
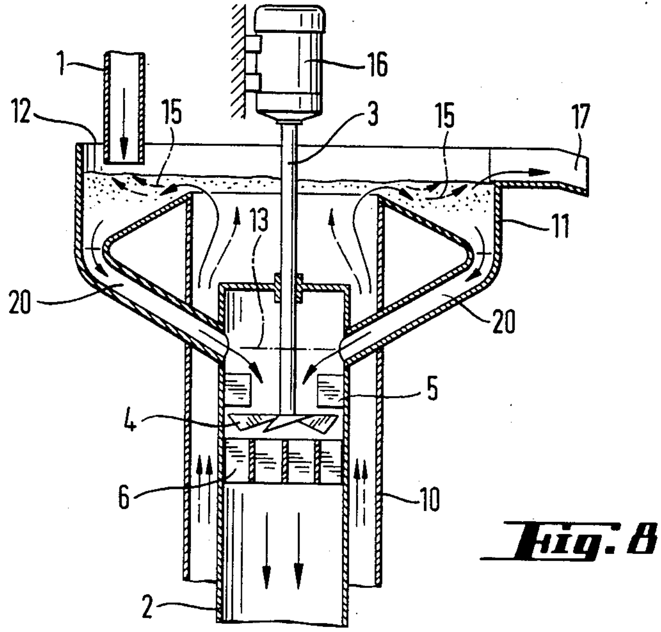
Figure 9:
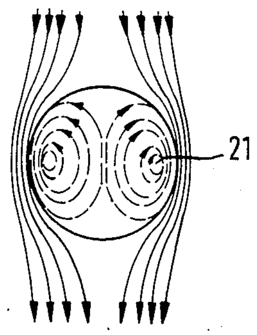
Figure 10:
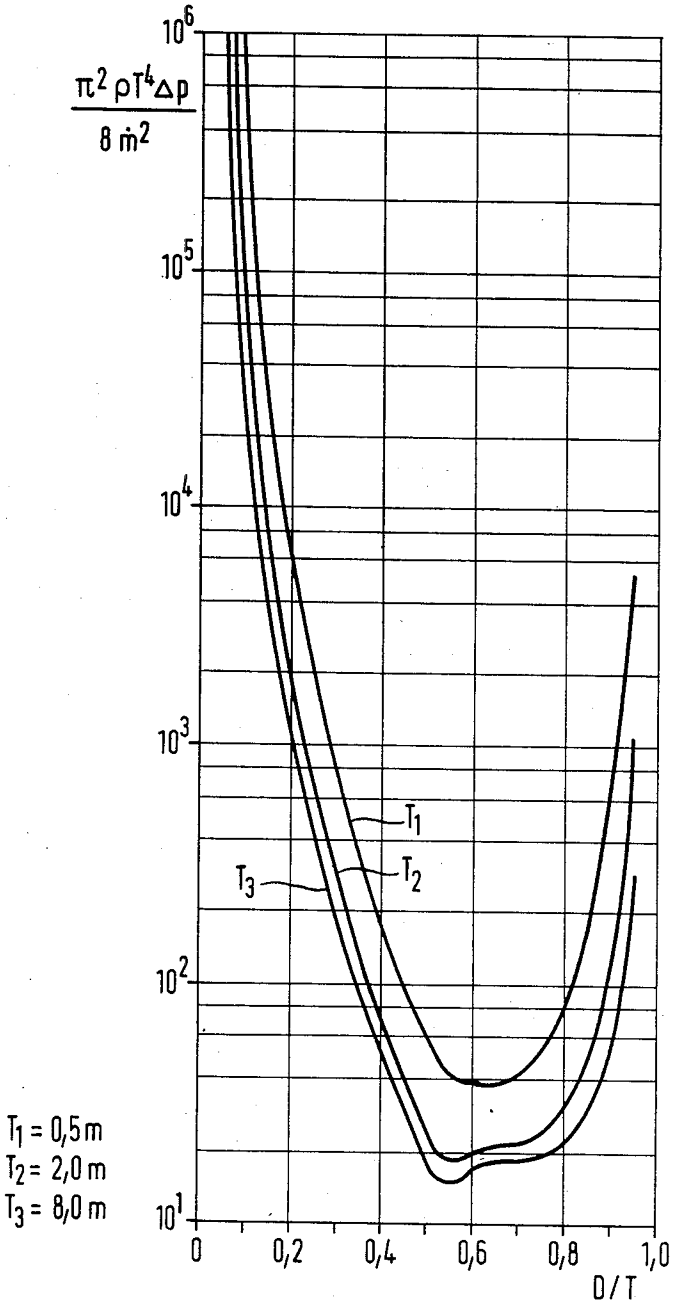

The counterbubble reactor of the invention and its various embodiments and details are described more closely by the aid of the figures attached, wherein:

FIG. 1 is an oblique axonometry projection, cut off and partly sectioned, of an embodiment of the present invention, a multiple tube reactor, FIG. 2 is a schematic vertical section of another embodiment, a CB reactor composed of separate tubes, FIG. 3 is the reactor of FIG. 2 in top view, FIG. 4 is a vertical section of an open CB reactor according to the invention, composed of tubes placed within each other, FIG. 5 is a vertical section of a structural variant of the top part of the reactor of FIG. 4, FIG. 6 is a vertical section of another structural variant of the top part of the reactor of FIG. 4, FIG. 7 is likewise a vertical section of another structural design for the top part of the reactor of FIG. 4, FIG. 8 is furthermore a vertical section of the top part of a reactor as in FIG. 4, in which return tubes for the sludge flow have been provided, FIG. 9 illustrates the convection flows of a gas bubble, and FIG. 10 is a pressure drop graph, associated with Example 4.

As shown in FIG. 1, a sludge flow is introduced through the sludge tube 1 into the counterbubble central tube 2 of the open counterbubble reactor. In the top part of the central tube 2 is located a pumping member, in the present instance a propeller mixer 4 on the end of a shaft 3, producing circulation of the sludge flow. The creation of harmful vortex is prevented by flow obstacles, or baffles, 5 on the inner rim of the central tube. Below the propeller 4 is located a flow-straightening grid 6. The oxygen or oxygen-containing gas is conducted into the sludge flow in the central tube 2, advantageously somewhat below the propeller 4, through the supply pipe 7. Around or immediately below the oxygen supply pipe 7 is provided a venturi 8 throttling the flow. As can be seen in the figure as well, there may be a plurality of supply pipes 7 as well as venturis 8. Since the height of the reactor is a multiple of its diameter, a central portion of the reactor has been cut off; the part thus left out may equally be fitted with oxygen supply pipes 7 and venturis 8 as have just been described. In the lower part 9 of the reactor, the central tube 2 is connected with three separate outer tubes 10 substantially parallelling the central tube and which are placed around the central tube 2 and through which the sludge flow ascends upwards. This apparatus has no actual bottom at all, and this impedes the sedimentation of solid matter. The upper part of the outer tubes 10 expands to constitute an integral widening 11 encircling the central tube 2, its top rim 12 at greater height than the top rim 13 of the central tube.

In FIG. 2 is schematically shown a reactor according to the present invention, in which the ascending flow of the sludge runs in one outer tube 10, this tube subtending a small angle with the central tube, or counterbubble tube, 2 but still substantially parallel therewith. The pipes are connected at the lower end, and the counterbubble tube 2 is also surrounded by the widening 11 of the top part of the outer tube 10. This apparatus design has the advantage that it provides a possibility for the gas formed in the ascending zone of the outer tube 10 to escape through gas venting pipes 14 already before the widening 11 of the top part of the outer tube. In the widened part 11, the gas venting and the paths 15 of gas bubbles from the sludge flow are indicated.

In FIG. 3 is shown, in top view, the escape of gas bubbles from the reactor of FIG. 2. The gas bubbles ascend with the sludge flow in the outer tube 10 to the widening 11 of the top part of the reactor, where their flow velocity slows down, and they rise to the surface with ease in the central part of the widening. In the vicinity of the central tube 2, the suction produced by the pumping member 4 starts to exert its influence again, and the gas bubbles still present in the sludge around the central tube are drawn into the circulation again.

In the apparatus design of FIG. 4, the outer tube 10 has been disposed annularly around the central tube 2. The figure has been cut off at several points, but as can be seen in the truncated sections, a plurality of oxygen supply pipes 7 and venturis 8 have been provided in the central tube 2.

The top part of the reactor of FIG. 4 has been shown in greater detail in FIG. 5. A mixer 4 on the end of a shaft 3 and rotated by a drive 16 produces a circulating flow in the sludge flow and in the gas supplied at a lower point into the sludge. The variation in level caused by the gas supply is levelled out by the aid of the widening 11. The return flow of the sludge that has ascended by the outer tube 10 runs as overflow and by effect of the suction produced by the mixer, over the top rim 13 of the central tube 2 back into the central tube. Part of the sludge flow is removed from the reactor through the overflow pipe 17.

FIG. 6 is one structural design of the top part of the reactor as in FIG. 5, allowing the efficiency of the propeller mixer to be improved by increasing its diameter.

In FIG. 7, circulation of the sludge and sludge/gas suspension has been provided by an external pump 18 instead of the mixer 4. The sludge is drawn from the widened section 11 of the reactor into the pump circulation, and it is returned into the central tube 2 via a circulation pipe 19. If the pipe 19 is above the sludge surface, as in FIG. 7, the sludge jet will entrain gas from above the sludge surface. The pipe 19 may also be carried directly into the central tube 2.

In FIG. 8 is shown the way in which the sludge is circulated from the widening 11 of the reactor of FIG. 4 to the central tube 2 via separate return pipes 20. In this apparatus design, the cross-section area of the widening 11 is larger than in the preceding designs (FIGS. 5, 6 and 7), thus facilitating the segregation of the gas from the sludge flow. Instead of separate return pipes 20, shorter return ducts may also be used. The sludge flow arriving from the outer pipes 10 by the return pipes and ducts 20 and the fresh sludge flow introduced in the reactor through the sludge tube 1 are supplied into the central tube 2.

In FIG. 9 are illustrated the convection flows of a gas bubble, and the observation can be made that when a gas bubble rises upwards in a stationary sludge, a differential velocity (turbulence) influencing the surface phenomena of the bubble is produced, which promotes the material and heat transport between sludge and bubble. This stage has been implemented, as taught by the present invention, by causing the sludge flow to flow downwards, whereby the differential velocity, and as its result the turbulence and the convection flows 21 taking place in the bubble, increase and promote the dissolution of the gas and the chemical reactions. It is to be noted that up to a certain bubble size the velocity of the bubble in the sludge increases. Therefore, the differential velocity is most powerful at the gas supply point, where the bubble size is largest, because thereafter the size of the bubble decreases, owing to increase of pressure as well as dissolving. It is advantageous also for this reason to provide for supply of oxidizing gas at several points.

The invention is described also by the aid of the following examples, of which Example 1 is a reference example.

EXAMPLE 1

Reference Example

A silicate ore containing precious metals in fine grained sulphides was oxidatively dissolved in a cylindrical test reactor with diameter 0.30 m and height 18.0 m. The ore, with degree of grinding 92.5%—200 mesh, was added in the form of aqueous sludge containing solid matter 774 g/l. A sludge charge of volume 1.22 m$^3$ was heated to 52° C., whereafter the supply of oxygen at 2.0 Nm$^3$/hr was started through four nozzles on the bottom of the reactor.

As the test results in the following table show, nickel and zinc went into solution only after 24 hours, and the dissolving of said metals was still incomplete after 48 hrs. Cobalt was rather scarcely dissolved, while copper was not dissolved. An indication of the inefficient oxidation by direct oxygen bubbling is also the powerful dissolution of iron, which is a consequence of the fact that iron which has gone into solution as bivalent is not oxidized to its trivalent form, which precipitates at the pH in question.

TABLE 1

| Dissolving time hrs | pH | Redox mV | Temperature C | Solution analyses g/l Ni | Zn | Co | Cu | Fe | Al | Solid matter analyses % Ni | Zn | Co | Cu | $S_{tot}$ | S° | $SO_4$ | C |
|---|---|---|---|---|---|---|---|---|---|---|---|---|---|---|---|---|---|
| 0 | | | | | | | | | | 0,32 | 0,60 | 0,021 | 0,10 | 7,3 | 0,18 | | 7,2 |
| 3,5 | 5,9 | −18 | 52 | | <0,002 | <0,005 | <0,005 | 0,009 | <0,010 | | | | | | | | |
| 7,5 | 6,0 | −85 | 66 | | 0,002 | <0,005 | <0,005 | 0,31 | <0,010 | | | | | | | | |
| 11,5 | 5,5 | −46 | 77 | <0,005 | | <0,005 | <0,005 | 0,31 | <0,010 | | | | | | | | |
| 15,5 | 5,3 | −3 | 97 | <0,005 | | <0,005 | <0,005 | | <0,010 | | | | | | | | |

TABLE 1-continued

| Dissolving time hrs | pH | Redox mV | Temperature C | Solution analyses Ni (g/l) | Zn | Co | Cu | Fe | Al | Solid matter analyses Ni (%) | Zn | Co | Cu | $S_{tot}$ | S° | $SO_4$ | C |
|---|---|---|---|---|---|---|---|---|---|---|---|---|---|---|---|---|---|
| 19,5 | 4,8 | −40 | 97 | <0,005 | 0,007 | <0,005 | <0,005 | 0,50 | <0,010 | | | | | | | | |
| 23,5 | 4,3 | +70 | 97 | <0,005 | 0,019 | <0,005 | <0,005 | 0,79 | <0,010 | 0,30 | 0,57 | 0,023 | 0,12 | 4,3 | 0,62 | 2,2 | 7,3 |
| 27,5 | 3,7 | +125 | 97 | 0,141 | 0,330 | <0,005 | <0,005 | 3,30 | 0,025 | | | | | | | | |
| 31,5 | 2,8 | +192 | 97 | 0,500 | 1,25 | 0,009 | <0,005 | 7,30 | 0,190 | 0,27 | 0,46 | 0,025 | 0,08 | 4,5 | 0,86 | 2,6 | 7,2 |
| 35,5 | 2,5 | +166 | 100 | 0,765 | 2,08 | 0,016 | <0,005 | 10,1 | 0,37 | 0,27 | 0,41 | 0,024 | 0,14 | | | | |
| 39,5 | 2,7 | +180 | 100 | 0,950 | 2,82 | 0,023 | <0,005 | 12,8 | 0,59 | 0,23 | 0,34 | 0,024 | 0,11 | 3,5 | 0,43 | 3,1 | 7,1 |
| 43,5 | 2,6 | +185 | 100 | 1,15 | 3,35 | 0,029 | <0,005 | 15,1 | 0,90 | 0,24 | 0,28 | 0,023 | 0,10 | | | | |
| 47,5 | 2,5 | +200 | 100 | 1,27 | 4,51 | 0,038 | <0,005 | 19,5 | 1,45 | 0,21 | 0,24 | 0,021 | 0,11 | 3,8 | 1,7 | 2,5 | 7,5 |
| 51,5 | 2,4 | +202 | 98 | 1,39 | 4,40 | 0,040 | <0,005 | 17,5 | 1,60 | 0,21 | 0,21 | 0,021 | 0,15 | 4,2 | 1,3 | 2,7 | 7,4 |

EXAMPLE 2

The ore used in Example 1 was dissolved in the form of aqueous sludge containing 744 g/l solid matter in the reactor described in the above-mentioned example after making the following improvements of the reactor, according to the present invention. A central tube with 0.22 m diameter had been installed in the reactor, the reactor contents being made to flow through this tube down close to the bottom of the reactor, and after a turn at the bottom once more up by a concentric outer pipe into a widening part located on the top and from which the sludge was conducted to the mouth of the central tube for a new flow circuit. To maintain the flow, an axial pumping member was used, below which oxygen was introduced at 2 $Nm^3/hr$.

The dissolution results compiled in the table show that the oxidative dissolving proceeded quite much faster and terminated with a better end result than in the preceding example. As a consequence of the oxidation of the sulphides, nickel and zinc were rapidly dissolved, as soon as 8 hours after commencement. Copper is present in the solution starting already after some 12 hours, and cobalt also goes into solution earlier and with clearly higher yield. Iron dissolved as ferrous iron was oxidized efficiently, to ferric iron precipitating at the early stages of dissolving, with the consequence that the pH of the solution at the final stage did not remain as low as it was in Example 1. Thanks to this, the process now directly led to a solution containing precious metals which was purer as regards aluminium.

TABLE 2

| Dissolving time hrs | pH | Redox mV | Temperature C | Solution analyses Ni (g/l) | Zn | Co | Cu | Fe | Al | Solid matter analyses Ni (%) | Zn | Co | Cu | $S_{tot}$ | S° | $SO_4$ | C |
|---|---|---|---|---|---|---|---|---|---|---|---|---|---|---|---|---|---|
| 0 | | | | | | | | | | 0,32 | 0,58 | 0,023 | 0,11 | 6,8 | 0,13 | 0,58 | 7,2 |
| 4 | 4,2 | +70 | 55 | 0,130 | 0,047 | <0,005 | <0,005 | 2,6 | <0,10 | 0,31 | 0,54 | 0,028 | 0,14 | | | | |
| 8 | 4,3 | +79 | 83 | 0,530 | 0,320 | <0,012 | <0,005 | 7,2 | 0,10 | 0,27 | 0,52 | 0,025 | 0,15 | 5,9 | 2,2 | 0,62 | 8,1 |
| 12 | 2,9 | +344 | 88 | 1,40 | 2,40 | 0,048 | 0,25 | 2,2 | 1,65 | 0,17 | 0,28 | 0,020 | 0,08 | 5,5 | 3,5 | 1,7 | 7,6 |
| 16 | 3,3 | +317 | 86 | 2,10 | 3,20 | 0,086 | 0,37 | 0,450 | 1,40 | 0,08 | 0,19 | 0,016 | 0,09 | 5,6 | 3,5 | 1,9 | 8,0 |
| 20 | 3,1 | +327 | 88 | 2,50 | 4,10 | 0,112 | 0,41 | 0,320 | 1,22 | 0,07 | 0,16 | 0,017 | 0,07 | 5,5 | 3,5 | 2,5 | 7,6 |
| 23 | 3,3 | +324 | 88 | 2,60 | 3,80 | 0,116 | 0,42 | 0,180 | 0,900 | 0,08 | 0,20 | 0,016 | 0,08 | 5,8 | 3,5 | 2,5 | 8,2 |
| 28 | 3,1 | +342 | 89 | 2,30 | 3,50 | 0,106 | 0,35 | 0,126 | 0,680 | | | | | | | | |
| 32 | 3,3 | +323 | 82 | 2,35 | 3,50 | 0,105 | 0,34 | 0,124 | 0,560 | | | | | | | | |
| 36 | 3,3 | +310 | 78 | 2,50 | 3,90 | 0,113 | 0,36 | 0,112 | 0,540 | 0,08 | 0,17 | 0,019 | 0,07 | | | | |
| 40 | 3,6 | +303 | 77 | 2,45 | 3,80 | 0,126 | 0,35 | 0,089 | 0,490 | | | | | | | | |
| 44 | 3,3 | +321 | 74 | 2,70 | 4,10 | 0,123 | 0,39 | 0,111 | 0,500 | 0,06 | 0,18 | 0,016 | 0,08 | | | | |
| 48 | 3,5 | +317 | 72 | 2,40 | 3,55 | 0,140 | 0,35 | 0,109 | 0,410 | 0,06 | 0,17 | 0,016 | 0,08 | 5,7 | 3,4 | 2,9 | 7,3 |

EXAMPLE 3

In tests according to the example, an open pressure reactor of the type shown in FIG. 4 was used, but which lacked the widening in the upper part of the reactor and the oxygen separator around the upper part of the central tube. The height of the reactor was 30 m, the diameter of the reactor 0.5 m, and the diameter of the inner tube 0.35 m. In the reactor was circulated sulphide-containing ore sludge with 50% by weight, at 75° C. The oxidation of the sulphides consumed 55 kg $O_2$ per ton of ore in said conditions. When the sludge was circulated with velocity 0.8 m/s and oxygen was introduced on an average 3.8 kg $O_2$ per hour and ton, the required reaction time was 15 hrs. The oxygen was conducted to 8 m depth. From the average level rise, 17 cm, the distribution of occurrence of the oxygen bubbles in the flow circuit in question could be calculated. The calculations revealed that oxygen bubbles occurred as wet gas of 3–4% by volume immediately after the point of insertion, and the oxygen bubbles were almost completely exhausted 15–20 m after the supply point. The oxygen bubbles disappeared totally before the reversal of the flow, by effect of dissolution and chemical reactions ensuing. In the reactor a downwardly increasing pressure prevailed, and this accelerated both the dissolving of oxygen and the chemical reactions. The ascending flow around the central tube was, as it rose up from the bottom, free of gas bubbles to begin with. However, the gas bubbles appeared as the pressure decreased. The appearance of oxygen bubbles on the surface was however insignificant, and studies revealed that this was because more than 90% of the oxygen bubbles occurring in the ascending flow were drawn with the sludge flow on another circuit, downwards in the central tube. Due to this, in the mixing procedure of the invention an oxygen efficiency higher than 95% is achievable. The excessively efficient entrainment of the gas bubbles into circulation may have its negative effects, particularly in the apparatus design of the example. Technical oxygen contains altogether 0.5% $Ar+N_2$ (mainly Ar), and this argon may become enriched in the circulation. In the test, oxygen was supplied into the reactor so that the sludge level rose 0.30 m. The flow velocity of the sludge was 0.8 m/s. In the upper part of the ascending tube 0.48 $m^3$ oxygen per hr were then separated from the flow circulation. It can be calculated that in an equivalent situation when the oxidative reactions consume almost all the oxygen but not the argon, argon will be enriched by a factor of 15–75 if the oxygen supply is e.g. 10–50 kg/h. The quantity of argon would then be 7.5–37.5% by volume in the escaping reactor gas. To avoid this situation, it is advantageous to use widening and oxygen separation means as shown in FIGS. 5–8 in the upper part of the reactor.

EXAMPLE 4

Since the information in the literature is very scanty concerning the local resistances of the three-dimensional turns at the lower and upper end e.g. of a design such as is seen in FIG. 4, for different outer and inner tube ratios, for calculating the pressure drops, experimental measurements were undertaken with 13 different ratios in order to find the figures in question. By the aid of the known pressure drop calculating formulae, the following dimensionless quantity was defined:

$$\frac{\pi^2 \rho T^4 \Delta P}{8\,\dot{m}^2} = f\left(\frac{D}{T}\right)$$

Using the above-mentioned test results, the ratio was calculated in application to three reactors $T_1$, $T_2$ and $T_3$ of the type of FIG. 4, using the values in the table below, and it was graphically presented, FIG. 10.

| Quantity | | Dimension | Reactor $T_1$ | Reactor $T_2$ | Reactor $T_3$ |
|---|---|---|---|---|---|
| Diameter of reactor | T | m | 0.5 | 2 | 8 |
| Height of reactor | H | m | 30 | 30 | 30 |
| Inner tube diameter | D | m | D | D | D |
| Sludge concentration | p | % by wt. | 50 | 50 | 50 |
| Temperature | t | °C. | 60 | 60 | 60 |
| Sludge quantity | m | kg/s | 100 | 1600 | 25600 |
| Sludge density | $\rho$ | kg/$m^2$ | 1455 | 1455 | 1455 |
| Overall pressure drop | ΔP | Pa | ΔP | ΔP | ΔP |

Although for the quantity of sludge the values of the aforementioned table have been used in the calculations, the shape of the curve remains essentially the same.

It can be observed from the curves that the pressure drop at a given sludge quantity m is lowest in the range D/T=0.4–0.85, corresponding to a ratio of the cross-section areas 0.2–3.0. The selection of this area is essential in the oxidation reactions of the present invention because a given sludge quantity (m) is able to transport a given amount of oxygen. It has to be noted, however, that the flow velocity must be above a certain limit.

We claim:

1. A process for conducting oxygen or a gas containing oxygen into sludge with high solid content constituted by a pulverous solid and a liquid, for dissolving the oxygen of the gas in the sludge and for reacting it efficiently with the sludge at low energy cost, comprising conducting the sludge into the upper part of a counterbubble zone of an open reaction space with a height a multiple of its diameter and causing the sludge by effect of a pumping member to flow downwards, supplying oxygen or a gas containing oxygen into the counterbubble zone distinctly above the reactor's bottom at one or several points and at the same time throttling the sludge flow in order to achieve good dispersion, making the oxygen of the gas dissolve in the sludge and to react therewith under increasing pressure; at the lower end of the tubular space, in the zone of dissolved oxygen, turning the direction of the sludge flow substantially 180° at a turning point, and causing the sludge flow to ascend by one or several, tubular or annular ascending zones, or regasified oxygen zones, whereat in order to maintain the flow velocity prevailing at the turning point and in the ascending zone high enough at every point, the ratio between the cross-section areas of the counterbubble zone and of the ascending zone is in the range of 0.2–3.0, when the gas content of the sludge varies the variations in level are levelled out and any harmful gas bubbles are removed from the sludge in a widening part of the ascending zone, which also encircles the upper part of the counterbubble zone and where the flow velocity of the sludge slows down; returning the undissolved oxygen into circulation in the counterbubble zone as well as the greater part of the sludge, while part of the sludge discharges as overflow over a top rim of the widening part.

2. A process according to claim 1, wherein the ascending zone is located annularly around the counterbubble zone.

3. A process according to claim 1, wherein the ascending zone consists of one or several separate zones located beside or around the counterbubble zone and which are substantially parallel therewith.

* * * * *